United States Patent [19]

Hirose

[11] Patent Number: 4,977,460
[45] Date of Patent: Dec. 11, 1990

[54] VIDEO SIGNAL REPRODUCING APPARATUS HAVING SETUP LEVEL ELIMINATION

[75] Inventor: Mitsuo Hirose, Osaka, Japan

[73] Assignee: NEC Home Electronics Ltd., Osaka, Japan

[21] Appl. No.: 187,252

[22] Filed: Apr. 28, 1988

[30] Foreign Application Priority Data

Apr. 30, 1987 [JP] Japan .................. 62-107642

[51] Int. Cl.$^5$ ............................................ H04N 5/94
[52] U.S. Cl. .................................... 358/336; 358/171
[58] Field of Search ............... 358/168, 169, 336, 337, 358/314, 171; 360/38.1, 33.1, 36.1, 36.2

[56] References Cited

U.S. PATENT DOCUMENTS

| | | | |
|---|---|---|---|
| 3,947,873 | 3/1976 | Buchan | 360/38.1 |
| 4,199,780 | 4/1980 | Taylor | 360/38.1 |
| 4,598,316 | 7/1986 | Rogers, III | 358/168 |
| 4,614,981 | 9/1986 | Fukui | 358/337 |
| 4,628,362 | 12/1986 | Waehmer | 358/168 |
| 4,665,444 | 5/1987 | Van Der Werf | 360/38.1 |
| 4,691,235 | 9/1987 | Okui | 358/168 |
| 4,769,726 | 9/1988 | Heitmann | 358/337 |
| 4,805,040 | 2/1989 | Oku | 360/38.1 |

FOREIGN PATENT DOCUMENTS 28569 7/1981 Japan .
178782 6/1985 Japan .

OTHER PUBLICATIONS

Julian L. Bernstein Video Tape Recording, John F. Riber Publisher, Inc., N.Y. 196.
CCIR Report 624 (1974).

Primary Examiner—Robert L. Richardson
Attorney, Agent, or Firm—Cushman, Darby & Cushman

[57] ABSTRACT

The present invention provides a video signal reproducing apparatus in which a set-up level of a video signal can be cancelled and the contrast of the signal maintained to obtain an accurately reproduced video signal. The present invention includes a set-up period indication circuit for generating a set-up period indication signal if a video signal with a set-up level exists, a subtraction circuit for subtracting a predetermined set-up level from the video signal containing the set-up level and an amplifier circuit for amplifying the subtracted video signal to a predetermined amplitude so that an accurately reproduced video signal is obtained.

7 Claims, 2 Drawing Sheets

VIDEO SIGNAL REPRODUCING APPARATUS HAVING SETUP LEVEL ELIMINATION

BACKGROUND OF THE INVENTION

1. Field of the Invention

The present invention generally relates to a video signal reproducing apparatus, and particularly relates to a video signal reproducing apparatus with an optical video disk reproducing apparatus.

2. Description of the Prior Art

Recently, television stations, due to technical development, are transmitting video signals in which the set-up level (a difference between a black level and a pedestal level) is made substantially zero %. Therefore, in many television receivers, brightness adjustment corresponds to a video signal having a set-up level of zero %.

However, the set-up level for a video signal obtained from optical video disk reproducing apparatuses is about 7.5%, a percentage which corresponds to the industry standard. Therefore, when a television receiver manufactured to make brightness adjustments on a video signal having a set-up level of zero % is used to display the video signal of an optical video disk reproducing apparatus, a portion of the picture which should be black becomes brighter than it should and the picture becomes unnatural.

If an adjustment is made to reduce the brightness so that the portion of the signal which should be black looks natural, the brightness of the white portion of the signal is reduced, thereby lowering the contrast and resulting in an unnatural picture.

Furthermore, if brightness adjustments are necessary every time a different type of video signal is input, the television receiver is inconvenient to use.

SUMMARY OF THE INVENTION

It is therefore an object of the present invention to eliminate the foregoing disadvantages.

It is another object of the present invention to provide a video signal reproducing apparatus in which the existing set-up level is cancelled and a signal which gives a picture that looks natural is obtained by keeping contrast in the white portion of the signal.

In order to attain the above objects, the present invention includes the following elements A set-up period indication circuit generates a set-up period indication signal if a set-up cancel mode is selected. A set-up subtraction circuit subtracts a predetermined set-up level from the composite video signal during the indicated set-up period and an amplifier circuit amplifies the subtracted composite video signal to a predetermined amplitude.

Using the above summarized invention, it is possible to obtain a composite video signal in which the set-up level is cancelled and obtain a natural looking picture is obtained.

BRIEF DESCRIPTION OF THE DRAWINGS

These and other advantages of the present invention may be appreciated from studying the following detailed description of the presently preferred embodiment together with the drawing in which.

DETAILED DESCRIPTION OF THE PREFERRED EMBODIMENT

Figure 1:
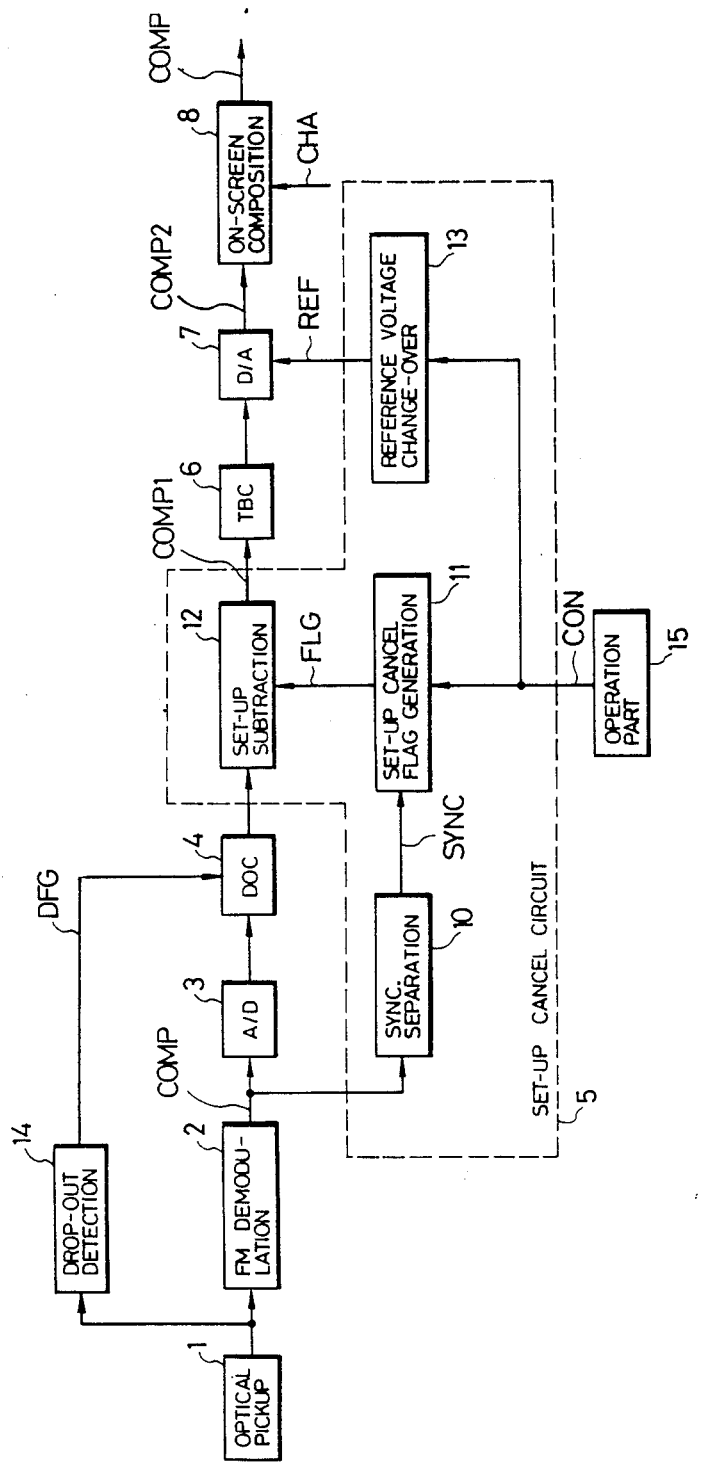
FIG. 1 is a block diagram showing an embodiment of the video signal reproducing apparatus according to the present invention.

In FIG. 1, an optical pickup 1 is provided for receiving a recorded signal from an optical video disk (not shown). The received signal is applied to an FM demodulation circuit 2 for FM-demodulation to obtain a base-band composite video signal COMP, shown in FIG. 2(A), which is then applied to an analog-to-digital conversion circuit 3 to convert the composite video signal COMP into digital data which is then applied to a drop-out compensation circuit 4.

The signal received by the optical pickup 1 is also applied to a drop-out detection circuit 14 for detecting a drop-out period. The absence of a carrier signal component of the received signal indicates a drop-out period. When a drop-out condition is detected by the drop-out detection circuit 14, a drop-out flag DFG is applied to the drop-out compensation circuit 4. The drop-out flag DFG is kept in the set state during a drop-out period and drop-out compensation circuit 4 uses interpolation processing to compensate for drop-out. the resulting compensated signal is then sent to a time base correction circuit 6 after passing through a set-up cancel circuit 5.

The set-up cancel circuit 5 is not used when a signal with no set-up level is received by optical pickup 1. Therefore, the signal with no set-up level passes through set-up cancel circuit 5 without adjustment to time-base correction circuit 6.

Time base correction circuit 6 corrects time base fluctuations, caused by, for example, uneven rotation of the optical disk, and applies the corrected video signal to a digital-to-analog conversion circuit 7. The digital-to-analog conversion circuit 7 converts the digital video signal, which has been subject to drop-out compensation and time base correction, into an analog signal COMP 2 (FIG. 2(C)) which is, in turn, applied to an on-screen composition circuit 8. The on-screen composition circuit 8 combines a character signal CHA, such as a signal representing a picture number, and the video signal COMP 2 to form a video signal COMP 3 which is displayed on a CRT display device.

The set-up cancel circuit 5 performs a cancelling operation when an ON-operation is indicated by an ON/OFF-control signal CON applied from an operation part 15. For example, the operation part 15 includes a switch by which a voltage level of the signal CON is changed over between high and low levels. When a video signal from an optical disk reproducing apparatus is received, it has a fixed set-up level of 7.5%, due to the industry standard, and a cancelling operation will be performed and CON will be in an ON state. An ON-operation is designated by the operation part 15. The set-up cancel circuit 5 includes a synchronization separator circuit 10, a set-up cancel flag generation circuit 11, a set-up subtraction circuit 12, and a reference voltage change-over circuit 13 for the digital-to-analog conversion circuit 7.

Figure 2A:
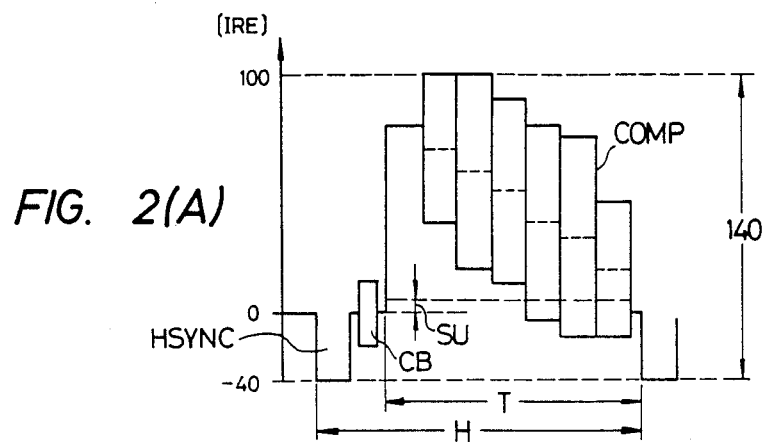
FIGS. 2(A) to 2(C) are diagrams showing waveforms of signals taken at various stages of the video signal reproducing apparatus of FIG. 1.

The synchronization separator circuit 10 separates a synchronizing signal SYNC from the composite video signal COMP which is then applied to the set-up cancel flag generation circuit 11. For example, FIG. 2(A) shows a horizontal synchronization signal HSYNC which is to be separated from the composite video signal by synchronization separator circuit 10. When the ON-operation is designated by the ON/OFF-control signal CON, the set-up cancel flag generation circuit 11 produces a flag FLG which is in the set state during a set-up period T as shown in FIG. 2(A). The period H shown on FIG. 2(A) represents the horizontal period, which is a reciprocal of the horizontal synchronizing frequency. This horizontal synchronizing frequency is approximately 15.73 KHz when an NTSC system is being used. Signal CB is a color burst signal used as a base phase for color demodulation and is always included in a video signal.

Figure 2B:
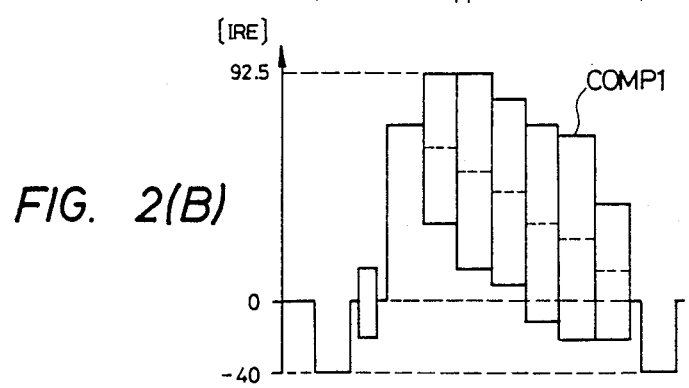
Figure 2C:
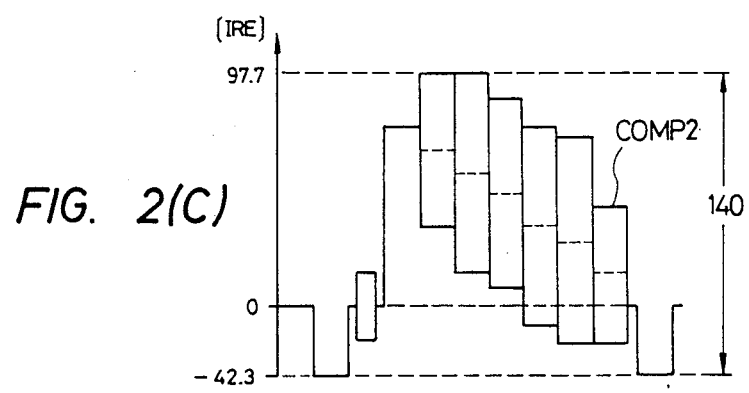

The set-up subtraction circuit 12 subtracts a predetermined set-up level SU from the video signal COMP, shown in FIG. 2(A), and sends the subtracted video signal COMP 1, Shown in FIG. 2(B), to the time base correction circuit 6 for time base correction as described above.

The video signal COMP 1 obtained from the set-up subtraction circuit 12 during a subtraction operation has the white portion of the signal reduced by the value of the subtraction. Without further treatment, the resulting signal would have a loss of contrast. To solve this problem, when the video signal COMP 1 is converted into an analog signal, a reference voltage change-over circuit 13 changes the reference voltage signal REF applied to the digital-to-analog conversion circuit 7 so that the resulting video signal COMP 2, shown in FIG. 2(C), has approximately the same amplitude as that of the video signal COMP before the set-up level is cancelled.

The reference voltage change-over circuit 13 inputs the ON/OFF-control signal CON so that it outputs the correct reference voltage signal REF.

The resulting COMP 2 video signal is then sent to the on-screen composition circuit 8 for processing as previously described and eventual display on a CRT display device.

As described above, in the foregoing embodiment, since a set-up level SU of a video signal can be cancelled and the contrast of white portion of the video signal maintained, a natural picture results even when the video signal is displayed by a CRT display device with a brightness level adjusted to correspond to a video signal having no set-up level.

Although the above description of the present invention was described with reference to an optical video disk reproducing apparatus, the present invention is not limited to use with an optical video disk reproducing apparatus, and therefore the present invention is intended to be broadly applied to any type of video signal reproducing apparatus which supplies a video signal having a set-up level to a display device having a brightness control adjusted for a video signal not having a set-up level.

Therefore, according to the present invention, it is possible to obtain a video signal reproducing apparatus in which the set-up level of a video signal can be cancelled and the contrast of the video signal maintained. This and other features of the present invention will become more apparent from the following claims.

What is claimed is:

1. An apparatus for producing an accurately reproduced video signal comprising:
   means for inputting a video signal;
   means for generating a set-up period indication signal if said video signal contains a set-up level during a set-up period;
   means for subtracting during said set-up period said set-up level from said video signal if said set-up period indication signal is present; and
   means for amplifying said subtracted video signal to obtain said accurately reproduced video signal.

2. An apparatus according to claim 1 further including:
   means for detecting if a drop-out area exists in said video signal; and
   means for compensating said drop-out area by interpolation.

3. An apparatus according to claim 1 further including means for correcting time-base fluctuations present in said video signal.

4. An apparatus according to claim 1 wherein said set-up period indication signal generation means includes means for separating a synchronization signal from said video signal and wherein said synchronization signal is then used to generate said set-up period indication signal.

5. An apparatus according to claim 4 wherein said set-up period indication signal generation means and said amplifying means receive a set-up level on signal from an operation part.

6. An apparatus for producing an accurately reproduced video signal comprising:
   means for inputting a first analog video signal;
   means for converting said first analog video signal to a digital signal;
   means for detecting if said first analog video signal contains a drop-out area;
   means for compensating said drop-out areas of said digital signal to obtain a compensated digital signal;
   means for generating a set-up period indication signal if said first analog video signal contains a set-up level during a set-up period;
   means for subtracting during said set-up period said set-up level from said compensated digital signal if said set-up period indication signal is present to obtain a subtracted digital signal;
   means for correcting time-based fluctuations in said subtracted digital signal to obtain a corrected digital signal;
   means for converting said corrected digital signal to a second analog video signal; and
   means for combining said second analog video signal with a character signal to obtain said accurately reproduced video signal.

7. An apparatus according to claim 6 wherein said digital to analog converter means and said set-up period indication signal generation means receives a set-up level on signal from an operation part if said first analog video signal contains said set-up level and wherein said digital to analog converter means includes means for amplifying said second analog video signal if it receives said set-up level on signal.

* * * * *